United States Patent [19]
Chandler et al.

[11] Patent Number: 5,882,471
[45] Date of Patent: Mar. 16, 1999

[54] VACUUM CONNECTOR APPARATUS FOR RETREADING TIRES

[76] Inventors: Johnny C. Chandler, 1144 Main Str. W., Hartselle, Ala. 35640; Douglas J. Conley, 144 Rosswoods Dr., Pewee Valley, Ky. 40056

[21] Appl. No.: 953,581

[22] Filed: Oct. 17, 1997

Related U.S. Application Data

[60] Provisional application No. 60/032,566, Oct. 31, 1996.

[51] Int. Cl. [6] .............................. B29O 30/52; F16L 41/08
[52] U.S. Cl. ......................... 156/394.1; 156/96; 156/286; 156/382; 156/909; 285/200
[58] Field of Search .................................. 156/96, 394.1, 156/909, 382, 286; 269/21; 294/64.1; 248/362, 363; 29/740, 743; 141/8, 65; 285/200

[56] References Cited

U.S. PATENT DOCUMENTS

| | | |
|---|---|---|
| B 329,612 | 1/1975 | Edler . |
| 1,527,831 | 2/1925 | Borgner . |
| 2,667,369 | 1/1954 | Harper . |
| 2,682,684 | 7/1954 | Kraft . |
| 2,962,757 | 12/1960 | Slemmons et al. ..................... 425/812 |
| 3,197,170 | 7/1965 | Schutt et al. ............................ 248/363 |
| 3,222,051 | 12/1965 | Bevilacqua et al. ...................... 269/21 |
| 3,730,801 | 5/1973 | Martin . |
| 3,743,564 | 7/1973 | Gross . |
| 3,745,084 | 7/1973 | Schelkmann . |
| 3,752,726 | 8/1973 | Barefoot . |
| 4,185,056 | 1/1980 | Detwiler . |
| 4,269,644 | 5/1981 | Goldstein . |
| 4,474,445 | 10/1984 | Wilson ................................... 248/362 |
| 4,500,375 | 2/1985 | Goldstein . |
| 4,571,277 | 2/1986 | Goldstein . |
| 4,588,460 | 5/1986 | Magee et al. . |
| 4,600,467 | 7/1986 | Perdue . |
| 4,732,415 | 3/1988 | Matin et al. . |
| 4,828,470 | 5/1989 | Perdue et al. . |
| 4,852,916 | 8/1989 | Johnson . |
| 4,875,279 | 10/1989 | Sakiadis ................................... 29/740 |
| 4,895,502 | 1/1990 | Beard et al. . |
| 4,917,353 | 4/1990 | Riley . |
| 4,920,629 | 5/1990 | Perdue et al. . |
| 5,046,762 | 9/1991 | Konishi . |
| 5,055,148 | 10/1991 | Lindsay et al. . |
| 5,306,130 | 4/1994 | King et al. . |

OTHER PUBLICATIONS

Shamrock Marketing Valve –2 Sheets –On Sale Dec. 1993.

*Primary Examiner*—Geoffrey L. Knable
*Attorney, Agent, or Firm*—Wheat, Camoriano, Smith and Beres PLC

[57] ABSTRACT

An envelope for retreading tires includes a valve which does not require the use of wicking material or other additions between the valve and the tire tread. This is accomplished by providing grooves in the bottom surface of the base of the valve, providing a flat ring surrounding the central hole on the bottom surface of the base of the valve, and providing internal passages from the grooves to the central hole. The valve base and stem are preferably made from two pieces which are joined together.

8 Claims, 5 Drawing Sheets

VACUUM CONNECTOR APPARATUS FOR RETREADING TIRES

BACKGROUND OF THE INVENTION

This application claims priority from U.S. Provisional Application 60/032,566, filed Oct. 31, 1996. The present invention relates to retreading tires, and, in particular, to an improved envelope and valve for retreading tires.

The art for retreading tires is well known. Generally, a tire carcass is provided; a vulcanizable, rubber-like material is placed on the outside of the tire carcass; and the new tread is placed on the outside of the rubber-like material. Then, wicking material is placed outside the tread; an envelope is placed surrounding the entire tire assembly; a vacuum is drawn on a valve on the envelope; and the assembly is placed inside a curing oven, where pressure and heat are applied. Then, the envelope is removed, and what remains is the retreaded tire.

There are several problems with this method. The use of wicking cloths requires the purchase of materials and requires labor to install the wicking cloths. Also, the wicking cloths often make an imprint on the tire during the curing process, resulting in the tire looking imperfect. Finally, staples and other retaining mechanisms used to hold the wicking cloths in place tend to pierce the envelope, reducing the life of the envelope and resulting in failed retreads if the hole in the envelope is not discovered before the retreading process occurs. This wastes a considerable amount of labor and materials.

SUMMARY OF THE INVENTION

The present invention provides a new valve which eliminates the need for the use of wicking material. The new valve can be used either with wicking material or without it. In the prior art, the wicking material is used to create an air passage so that air can flow around the outside of the tire tread to the valve and out the valve as the suction is being drawn. This helps ensure that the entire volume inside the envelope is properly evacuated. If wicking material is not used, there tend to be parts of the tire in which the flow of air is blocked. This results in those parts not being properly evacuated. Any part that is not properly evacuated is not receiving the full pressure of the pressurized chamber during the curing process, and, in those parts, there may not be a good adherence of the tread to the carcass.

DESCRIPTION OF THE PREFERRED EMBODIMENTS

Figure 1:
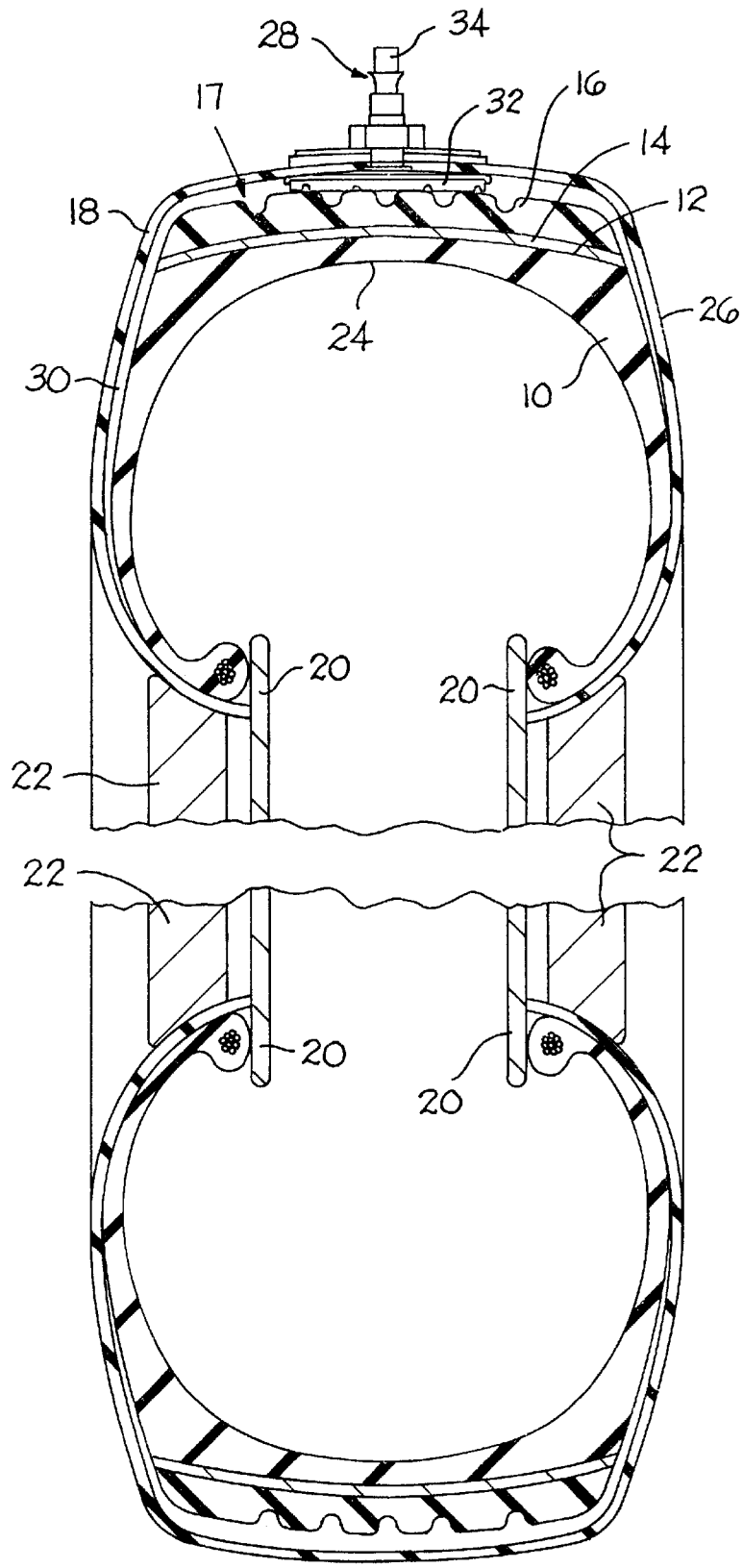
FIG. 1 is a sectional view, partially broken-away, of a tire that has been prepared for recapping in accordance with the present invention.
Figure 2:
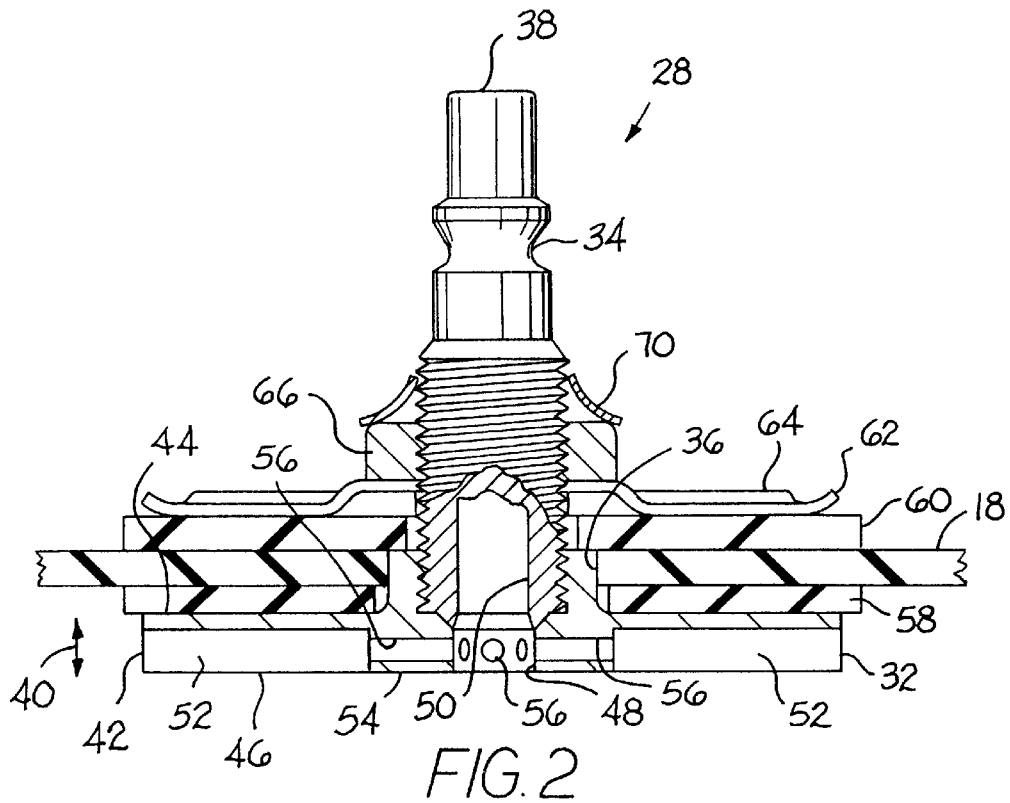
FIG. 2 is a sectional view through the valve of FIG. 1.
Figure 4:
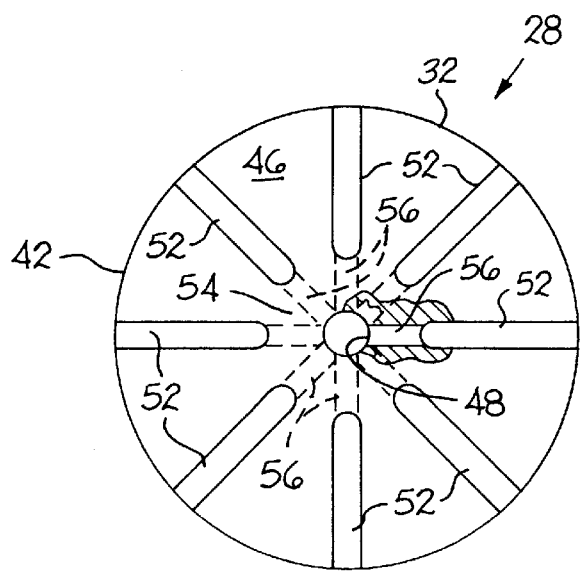
FIG. 4 is a bottom view of the valve of FIG. 1.

FIGS. 1–4 show a first embodiment of an apparatus for retreading tires. As shown in FIG. 1, there is a tire carcass 10. The tread has been removed from the outer surface 12 of the carcass 10, and the surface 12 has been buffed to prepare it for retreading as is well known in the art. A vulcanizable, rubber-like material 14, such as cushion gum or other similar material known in the art, is placed on the outer surface, 12 of the carcass 10. A new tread 16 is placed outside the vulcanizable, rubber-like material 14. The combination of the carcass 10, the vulcanizable material 14, and the new tread 16 will be referred to as the tire assembly 17. An envelope 18 is then placed outside the tire assembly 17 and is sealed against the carcass 10 by means of inner and outer clamping plates 20, 22, forming a closed space 30 between the inside of the envelope 18 and the outside of the tire assembly 17. The clamping plates 20, 22 prevent ambient air from getting between the envelope 18 and the carcass 10, but they permit ambient air to reach the inner surface 24 of the carcass 10, so the inner surface 24 of the carcass 10 and the outer surface 26 of the envelope are both at ambient pressure.

There is a vacuum line connector unit or valve 28 in the envelope 18, which permits a vacuum to be drawn in the space 30 between the envelope 18 and the tire assembly 17. The valve 28 is shown in more detail in FIGS. 2–4. The valve 28 includes a base 32 and a stem 34, which are preferably made as two separate pieces joined together by threading and/or swaging. In the preferred embodiment, a locking material, such as 3M Scotch Guard model 2353 is placed on the threads at the juncture of the base 32 and stem 34 to prevent leakage through the joint. It would also be possible to make the valve 28 as a single piece, but that would be more expensive.

Figure 3:
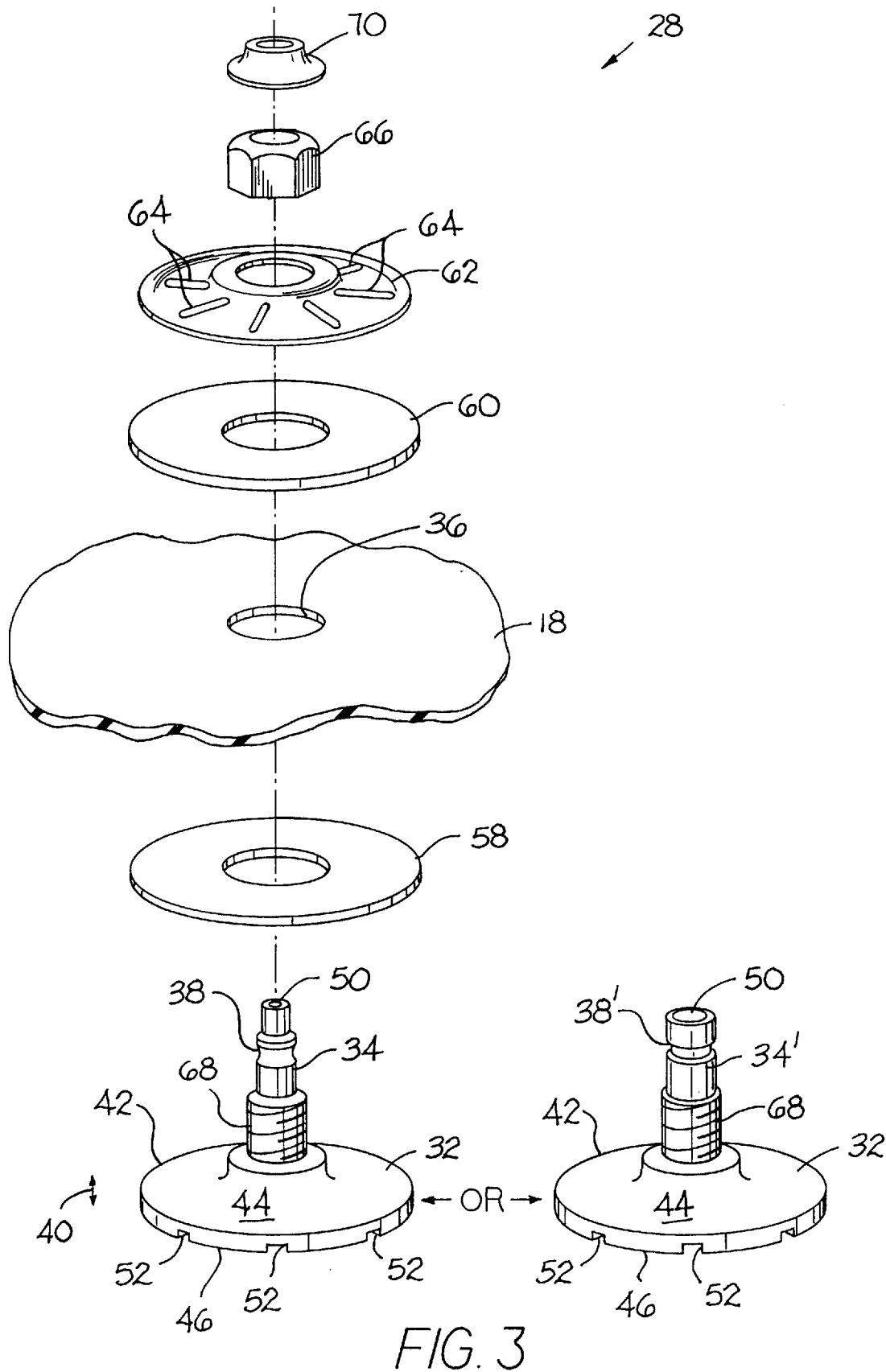
FIG. 3 is an exploded perspective view of the valve of FIG. 2.

The base 32 of the valve 28 lies inside the envelope 18, and the stem 34 projects out through a hole 36 in the envelope 18. The upper portion (or free end) 38 of the stem 34 may have any desired contour to enable it to mate with existing fittings in the shop. FIG. 3 shows two different contours of the free end 38, 38' of the stem 34, 34'.

The base 32 of the valve 28 has a thickness 40 and defines a curved periphery 42 having no sharp edges. The base 32 has a top surface 44 and a substantially flat bottom surface 46. The base 32 also defines a centered hole 48 extending completely through the base 32, from the a bottom surface 46 to the top surface 44. The stem 34 has a connecting end 35 which joins to the base. The stem 34 defines a central aperture 50, which is aligned with the central hole 48 in the base.

The bottom surface 46 of the base 32 defines a plurality of indentations 52, which extend from the periphery 42 toward the center of the base, and which terminate short of the central hole 48, leaving a flat, uninterrupted central portion 54 surrounding the central hole 48. There is also a plurality of internal paths 56 in the base 32, extending from the indentations 52 to the central hole 48, so that air can flow along the indentations 52, through the internal paths 56, through the central hole 48 and central aperture 50, and out the free end 38 of the stem 34. The uninterrupted ring 54 is an important aspect of this design, because it prevents the tire tread 16 from being pulled up into the central hole 48 when a vacuum is drawn on the valve 28.

In addition to the valve 28 and envelope 36, there are a few other pieces that are used in the valve assembly. There are inner and outer pieces of material 58, 60, which lie against the inner and outer surfaces of the envelope 18, respectively, at the hole 36. These pieces 58, 60 are preferably made of a material that is like the envelope material or like the material of an inner tube and serve as gaskets. There is a washer 62, which is preferably made with upstanding ribs 64 for greater rigidity. There is a nut 66, which is threaded onto threads 68 on the outer surface of the stem 34, and there is a lock washer 70, which locks the valve assembly and envelope together.

The nut 66 is tightened down, pressing the washer 62 down, and squeezing the gaskets 58, 60 and envelope 18 between the washer 62 and the base 32 of the valve 28, to form a seal around the hole 36 in the envelope. Once the nut 66 has been tightened, the lock washer 70 is pressed into place.

Figure 6:
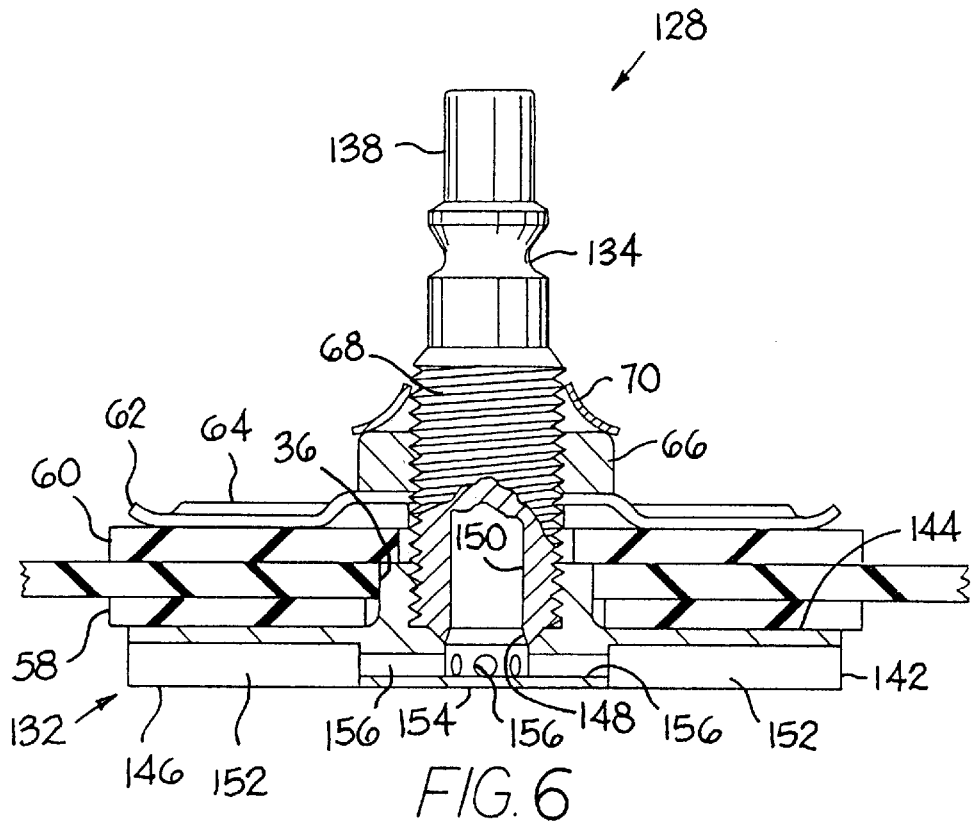
FIG. 6 is a sectional view through a second embodiment of a valve made in accordance with the present invention.
Figure 7:
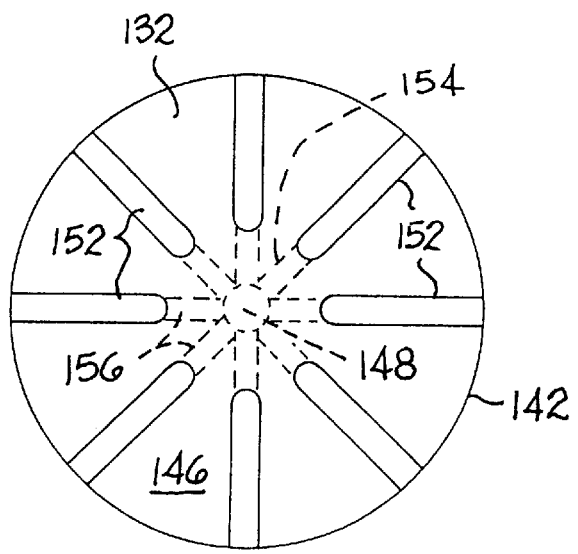
FIG. 7 is a bottom view of the valve of FIG. 6.

An alternative embodiment of the valve 128 is shown in FIGS. 6 and 7. In this embodiment, the central hole 148 in the base 132 stops short of the bottom surface 146 of the base 132, and the uninterrupted central portion 154 of the bottom surface 146 is directly below the central hole 148. Except for that difference, this embodiment is identical to the first embodiment, with indentations 152 in the bottom surface 146 of the base 132, and with internal paths 156 providing passages through which air can flow along the indentations 152, through the internal paths 156, through the central hole 148 in the base 132, through the central aperture 150 in the stem 134 and out the free end 138 of the stem. This embodiment also has gaskets 58, 60, a washer 62, a nut 66, threads 68, and a lock washer 70.

Figure 5:
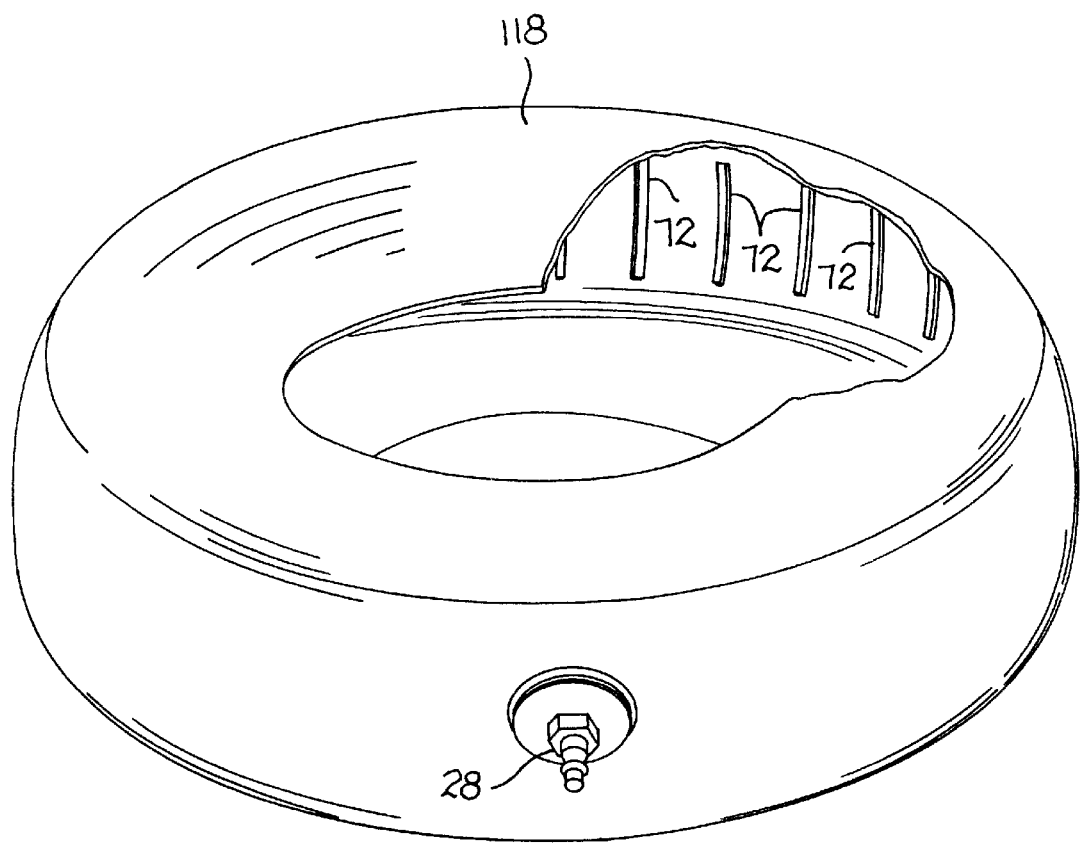
FIG. 5 is a perspective view of an alternative embodiment of an envelope for use in the assembly of FIG. 1.

FIG. 5 shows an alternative embodiment of the envelope 118. While the envelope preferably is made of a material that would not hold the shape shown in FIG. 5 without a tire assembly inside, it is being shown in that shape in order to better see the details. In this alternative embodiment, the central portion of the internal surface of the envelope 118 has grooves 72, which provide passages for air to flow when the envelope 118 is pressed firmly against the tread 16. In most cases, the tread 16 will provide sufficient passages, but putting grooves 72 on the inner surface of the envelope 118 is just added insurance that there will be sufficient flow of air when the vacuum is drawn.

With both the smooth envelope 18 and the grooved envelope 118, it is preferred to apply a lubricant to the inside surface of the envelope before placing the envelope over the tire assembly 17. A preferred lubricant is ID 2117 Lube (A-B-C) from Quality Dispersions, Inc., St. Marys, Pa. The lubricant helps prevent the envelope from sticking to the tire assembly 17 during curing.

The curing process is well known in the art. Envelopes 18 are placed over the tire assemblies 17, as shown in FIG. 1. The envelopes 18 and tire assemblies 17 are put into the curing chamber (not shown). A vacuum of 20–24 psig is drawn on the valve 28, pulling air out of the space 30. The pressure inside the curing chamber is brought up to a relatively high pressure, on the order of 85 psig, and this pressure acts both on the outside surface 26 of the envelope 18 and on the inside surface 24 of the tire 10, squeezing the envelope 18 and tire 10 together, and pressing the tread 16 and the carcass 10 together. The temperature in the curing chamber is brought up to the desired curing temperature, on the order of 210° F. to 325° F., and the tire assemblies 17 are held under these temperature and pressure conditions for the desired period of time, on the order of 2–4 hours.

When the curing is complete, the temperature and pressure in the curing chamber are reduced, and the valve 28 sees the ambient pressure, releasing the vacuum. The clamp plates 22, 24 are removed, the envelope 18 is removed, and the retreaded tire assembly 17 is finished and ready for use.

It will be obvious to those skilled in the art that modifications may be made to the embodiments described herein without departing from the scope of the present invention.

What is claimed is:

1. In a vacuum line connector unit for use in evacuating an envelope for retreading tires and adapted to sealingly engage the envelope, the improvement comprising:

a base, having a curved periphery and a thickness, and defining a top surface and a substantially flat bottom surface and a central hole; a plurality of indentations in said flat bottom surface, wherein the bottom surface defines a flat, uninterrupted central portion, and the indentations extend from the periphery toward the uninterrupted central portion; and a plurality of internal paths in said base, extending from said indentations to said central hole.

2. A connector unit as recited in claim 1, wherein said central hole extends through the bottom surface and the uninterrupted central portion is a ring surrounding the central hole.

3. A connector unit as recited in claim 1, wherein the central hole terminates short of the bottom surface, and the uninterrupted central portion of the bottom surface lies directly beneath said central hole.

4. A connector unit as recited in claim 1, and further comprising a stem, extending outwardly from the top surface of said base, wherein said stem has a free end and defines a central aperture which extends from said central hole to said free end.

5. A connector unit as recited in claim 1, wherein the centered hole is positioned at the geometric center of the base.

6. In a vacuum line connector unit for use in evacuating an envelope for retreading tires, and adapted to sealingly engage the envelope, the improvement comprising:

a base, having a curved periphery and a thickness, and defining a top surface and a substantially flat bottom surface and a central hole, the substantially flat bottom surface including a plurality of indentations, the indentations extending from the periphery toward the central hole; a plurality of internal paths in said base extending from the indentations to the central hole; and a stem, which is a separate member from said base, said stem defining a free end, a connecting end, and a central aperture, and said stem being reversibly joined to said base at the connecting end of said stem, such that, when a vacuum is drawn on the stem, gases flow along the indentations, through the internal paths, and through the central aperture of the stem; and wherein the bottom surface of said vacuum line connector unit defines a flat, uninterrupted central portion surrounding the central hole.

7. A connector unit as recited in claim 6, wherein said stem and base are connected together so tightly that, when a vacuum is drawn on the free end of said stem, gas does not leak through the connection between the stem and base.

8. A connector unit as recited in claim 7, wherein a sealing material is inserted between the base and stem to ensure a sealed connection between them.

* * * * *